United States Patent
Wetterwald et al.

(10) Patent No.: US 10,805,211 B2
(45) Date of Patent: Oct. 13, 2020

(54) FORECASTING SDN FABRIC SATURATION AND MACHINE LEARNING-BASED FLOW ADMISSION CONTROL

(71) Applicant: Cisco Technology, Inc., San Jose, CA (US)

(72) Inventors: Patrick Wetterwald, Mouans Sartoux (FR); Pascal Thubert, La Colle sur Loup (FR); Jean-Philippe Vasseur, Saint Martin D'uriage (FR); Eric Levy-Abegnoli, Valbonne (FR); Stephane Labetoulle, Saint-Jeannet (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/274,567

(22) Filed: Feb. 13, 2019

(65) Prior Publication Data

US 2020/0259740 A1    Aug. 13, 2020

(51) Int. Cl.
*H04L 12/721*     (2013.01)
*H04L 12/725*     (2013.01)
(Continued)

(52) U.S. Cl.
CPC .......... *H04L 45/38* (2013.01); *G06F 9/45533* (2013.01); *H04L 43/0876* (2013.01);
(Continued)

(58) Field of Classification Search
CPC ......... H04L 45/02; H04L 45/64; H04L 45/54; H04L 45/745; H04L 49/25; H04L 49/351
See application file for complete search history.

(56) References Cited

U.S. PATENT DOCUMENTS 8,345,548 B2    1/2013 Gusat et al.
9,401,857 B2    7/2016 Anghel et al.
(Continued)

FOREIGN PATENT DOCUMENTS

WO    2018108278    6/2018

OTHER PUBLICATIONS

"Using Cisco ACI in Telecom Data Centers to Enhance Automation, Service Chaining, Scalability, Operational Simplification, Troubleshooting, and provide Consistent Policy across any location", White Paper, https://www.cisco.com/c/en/us/solutions/collateral/data-center-virtualization/application-centric-infrastructure/white-paper-c11-740717.pdf, 50 pages, 2018, Cisco.

(Continued)

*Primary Examiner* — Chandrahas B Patel
(74) *Attorney, Agent, or Firm* — Behmke Innovation Group LLC; Kenneth J. Heywood; Jonathon P. Western (57) ABSTRACT

In one embodiment, a supervisory device for a software defined networking (SDN) fabric predicts characteristics of a new traffic flow to be admitted to the fabric, based on a set of initial packets of the flow. The supervisory device predicts an impact of admitting the flow to the SDN fabric, using a heatmap-based saturation model for the SDN fabric. The supervisory device admits the flow to the SDN fabric, based on the predicted impact. The supervisory device uses reinforcement learning to adjust one or more call admission control (CAC) parameters of the SDN fabric, based on captured telemetry data regarding the admitted flow.

15 Claims, 8 Drawing Sheets

(51) Int. Cl.
H04L 12/801 (2013.01)
H04L 12/26 (2006.01)
G06F 9/455 (2018.01)
H04L 12/911 (2013.01)

(52) U.S. Cl.
CPC .......... H04L 45/302 (2013.01); H04L 47/127 (2013.01); H04L 47/781 (2013.01); *G06F 2009/45562* (2013.01); *G06F 2009/45595* (2013.01)

(56) References Cited

U.S. PATENT DOCUMENTS 9,806,983 B2 * 10/2017 Civanlar ............... H04L 45/02
2016/0315822 A1 10/2016 Anderson et al.

OTHER PUBLICATIONS

Bashar, et al., "Machine Learning based Call Admission Control Approaches: A Comparative Study", 2010 International Conference on Network and Service Management—CNSM 2010: Short Papers, pp. 431-434, 2010, IEEE.

Carvalho, et al., "Prediction-Based Admission Control for IaaS Clouds with Multiple Service Classes", 2015 IEEE 7th International Conference on Cloud Computing Technology and Science, pp. 82-90, 2015, IEEE.

Chen, et al., "AuTO: Scaling Deep Reinforcement Learning for Datacenter-Scale Automatic Traffic Optimization", SIGCOMM '18, Aug. 20-25, 2018., Budapest, Hungary., 15 pages, 2018, ACM.

Ferra, et al., "Applying Reinforcement Learning to Packet Scheduling in Routers", IAAI 2003, pp. 79-84, 2003, American Association for Artificial Intelligence.

Leiserson, C.E., "Fat-trees: Universal networks for hardware-efficient supercomputing", IEEE Transactions on Computers, vol. C-34, No. 10, pp. 892-901, Oct. 1985, IEEE.

Onisick, Joe., "Data Center Bridging", http://www.definethecloud.net/data-center-bridging/, 4 pages, Mar. 12, 2010., Define The Cloud.

Patton, Diane., "Converge your network with priority flow control (PFC)", https://cumulusnetworks.com/blog/priority-flow-control/, 4 pages, Jun. 23, 2017., Cumulus Networks, Inc.

Poupart, et al., "Online flow size prediction for improved network routing", 2016 IEEE 24th International Conference on Network Protocols (ICNP), Singapore, pp. 1-6, 2016, IEEE.

Tong, et al., "Reinforcement Learning for Call Admission Control and Routing under Quality of Service Constraints in Multimedia Networks", Machine Learning, 49, pp. 111-139, 2002, Kluwer Academic Publishers.

Yuan, et al., "On Nonblocking Folded-Clos Networks in Computer Communication Environments", 2011 IEEE International Parallel & Distributed Processing Symposium, Anchorage, AK, pp. 188-196, 2011, IEEE.

Zhu, et al., "Congestion Control for Large-Scale RDMA Deployments", SIGCOMM '15, Aug. 17-21, 2015, London, United Kingdom., pp. 523-536, 2015, ACM.

Zhu, et al., "ECN or Delay: Lessons Learnt from Analysis of DCQCN and TIMELY", CoNEXT '16, Dec. 12-15, 2016, Irvine, CA, USA., 15 pages, 2016, ACM.

* cited by examiner

FORECASTING SDN FABRIC SATURATION AND MACHINE LEARNING-BASED FLOW ADMISSION CONTROL

TECHNICAL FIELD

The present disclosure relates generally to computer networks, and, more particularly, to forecasting saturation in software defined networking (SDN) fabrics and using machine learning-based flow admission control in SDN fabrics.

BACKGROUND

Software defined networking (SDN) represents an evolution of computer networks away from a decentralized architecture to one of centralized, software-based control. More specifically, in traditional computer networks, the control plane (e.g., selection of the routing path) and the data plane (e.g., forwarding packets along the selected path) are intertwined, with control plane decisions being made in a decentralized manner via signaling between the networking devices. In contrast, control plane decisions in an SDN-based network architecture are made by a centralized controller and pushed to the networking devices, as needed.

While applicable to any number of different types of network deployments, SDN is particularly of relevance to cloud service provider networks. Indeed, in a traditional client-server architecture, the network need only support traffic between the client and the server. However, with cloud computing, each transaction with a client may result in a large amount of "east-west" traffic between nodes in the cloud (e.g., to perform a query or computation in parallel, etc.), as well as the traditional "north-south" traffic between the cloud and the client. In addition, the very nature of cloud computing environments allows for the rapid scaling of resources with demand, such as by spinning new nodes up or down. In such situations, centralized control over the control plane results in better network performance over that of decentralized control. However, despite the overall benefits of SDN, flow admission control and network fabric saturation remain challenging in SDN fabrics. Indeed, admitting a flow to the SDN fabric that requires too many resources could cause a saturation condition to occur in which there are not enough resources available to support all of the flows.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a supervisory device for a software defined networking (SDN) fabric predicts characteristics of a new traffic flow to be admitted to the fabric, based on a set of initial packets of the flow. The supervisory device predicts an impact of admitting the flow to the SDN fabric, using a heatmap-based saturation model for the SDN fabric. The supervisory device admits the flow to the SDN fabric, based on the predicted impact. The supervisory device uses reinforcement learning to adjust one or more call admission control (CAC) parameters of the SDN fabric, based on captured telemetry data regarding the admitted flow.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
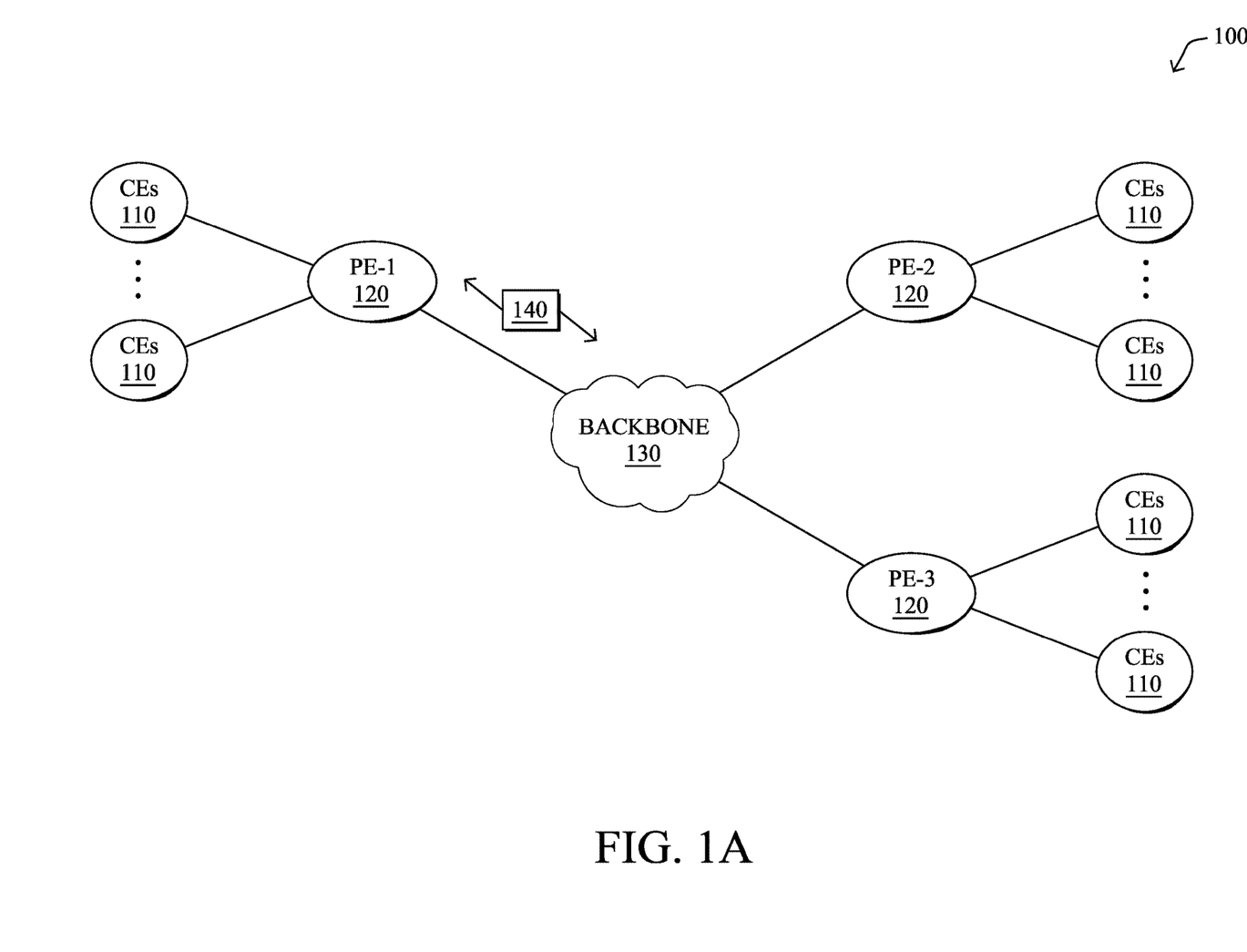
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B 1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
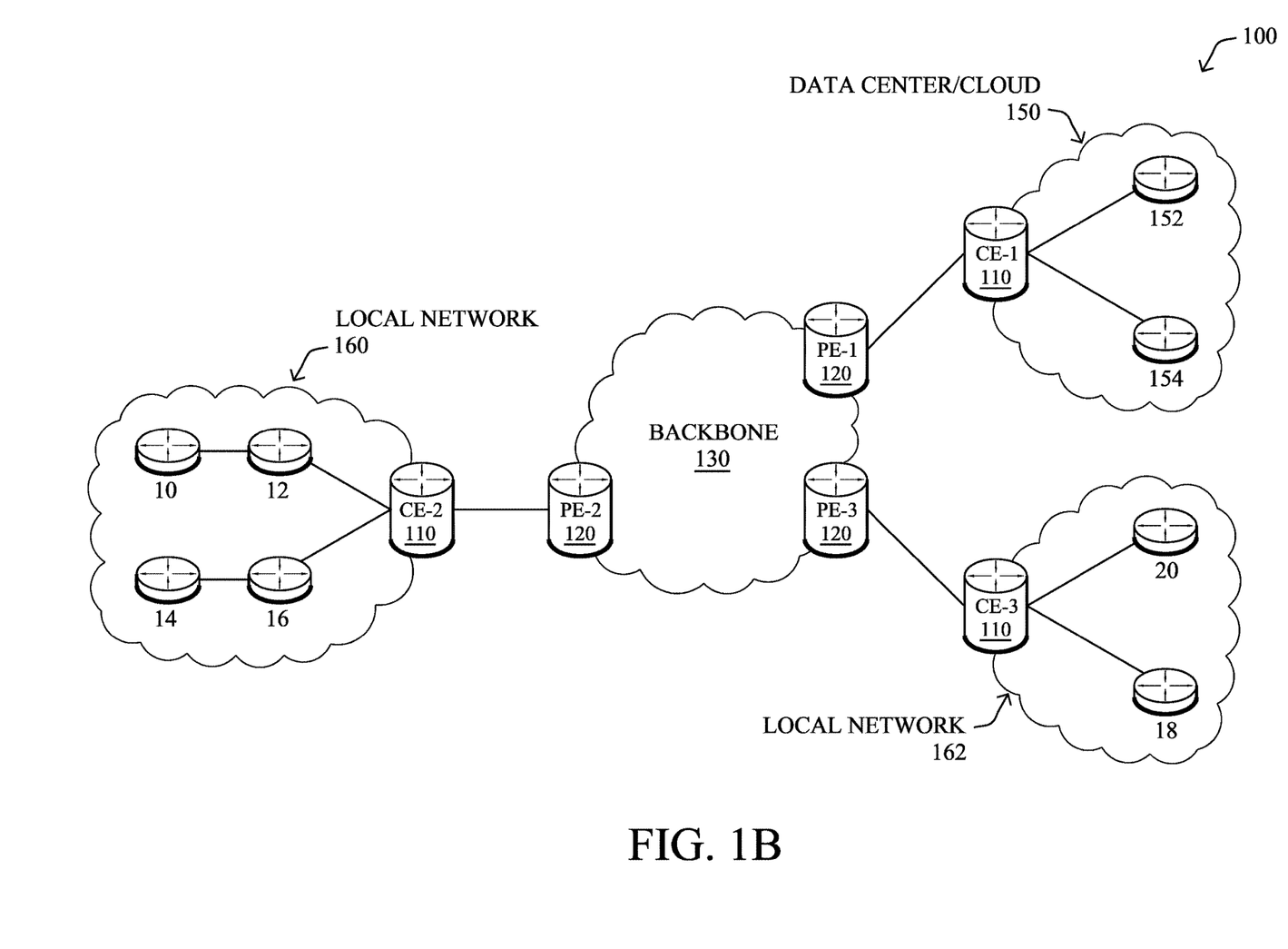

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
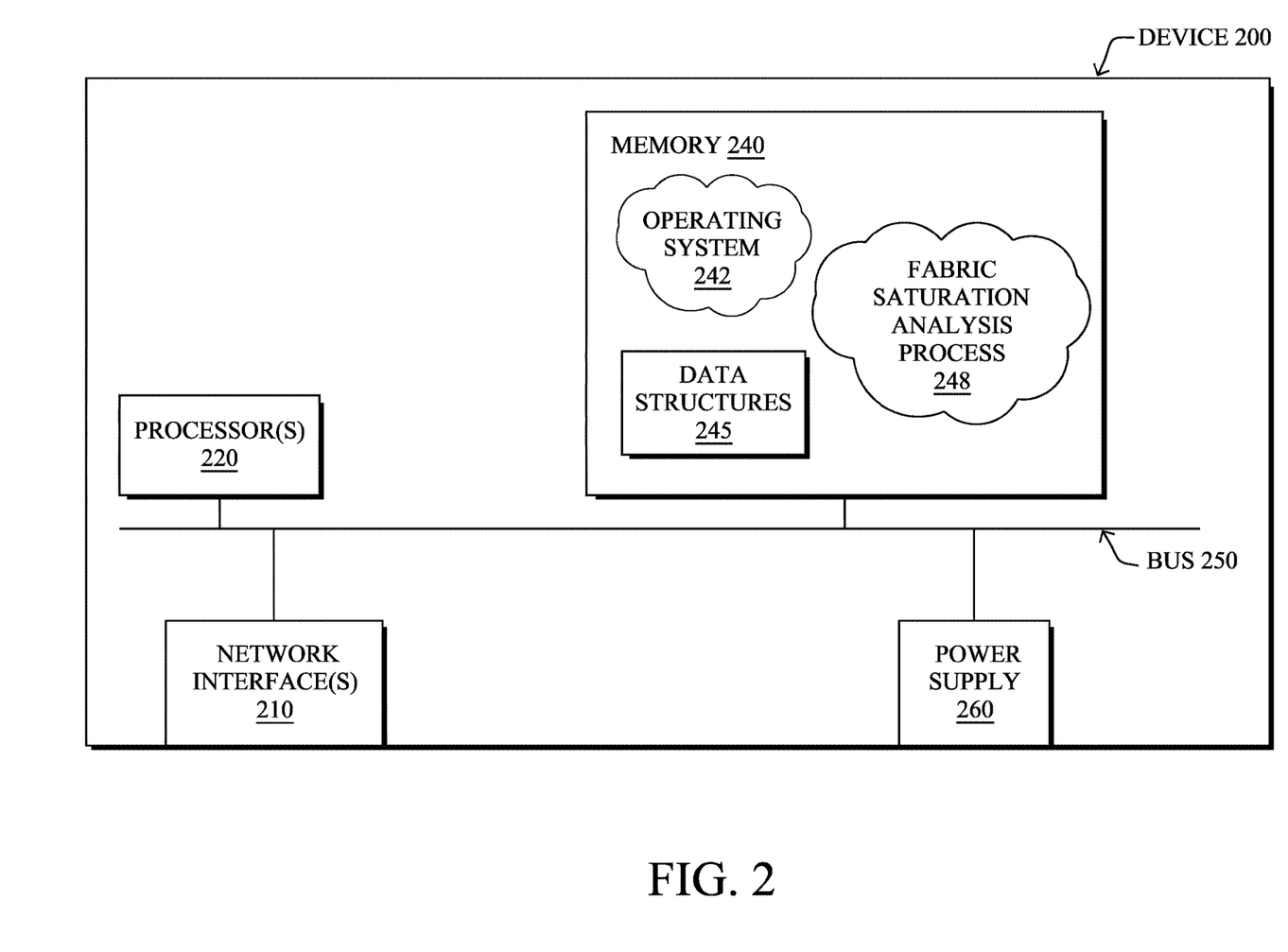
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a fabric saturation analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, fabric saturation analysis process 248 may execute one or more machine learning-based models to predict traffic congestion in a network and, based on the predictions, initiate corrective measures when there is likely to be congestion. Fabric saturation analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, fabric saturation analysis process 248 can use the model M to classify new data points, such as information regarding new traffic flows in the network. Often, M is a statistical model, and the cost function is inversely proportional to the likelihood of M, given the input data.

In various embodiments, fabric saturation analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "normal," or "saturation-related." On the other end of the spectrum are unsupervised techniques that do not require a training set of labels. Notably, while a supervised learning model may look for previously seen patterns that have been labeled as such, an unsupervised model may instead look to whether there are changes in the behavior of the network traffic over time. Semi-supervised learning models take a middle ground approach that uses a greatly reduced set of labeled training data.

Example machine learning techniques that fabric saturation analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted there to be saturation within a network fabric. Conversely, the false negatives of the model may refer to the number of times the model incorrectly predicted normal operation of the network, when saturation actually resulted. True negatives and positives may refer to the number of times the model correctly predicted either normal behavior or saturation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, software defined networking (SDN) represents an evolution of computer networks that centralizes control plane decisions with a supervisory device. For example, in Application Centric Infrastructure (ACI), an SDN-based architecture from Cisco Systems, Inc., control plane decisions may be made by a centralized APIC. However, even with centralized control, there still exists the potential for seasonal congestion to occur on certain links in the network fabric.

In general, an SDN-based network fabric may utilize a leaf-spine architecture, such as CLOS and Fat-Tree architectures. This is particularly true in the case of data center and cloud networks that are poised to deliver the majority of computation and storage services in the future. In a Fat-Tree, nodes are organized in a tree structure with branches becoming 'fatter' towards the top of the hierarchy. In the context of computer networks, this increasing 'fatness' typically corresponds to increasing bandwidth towards the top of the hierarchy. CLOS networks typically involve multiple stages (e.g., an ingress stage, a middle stage, and an egress stage), with 'crossbar' switches at different stages that are interwoven such that multiple paths are available for switching, so that one traffic flow does not block another.

As would be appreciated, an SDN fabric that implements a leaf-spine architecture may operate by emulating a very large switch by interleaving many smaller switches, resulting in much lower cost and higher scalability. The benefits of such designs include, but are not limited to, the availability of an equal cost multi-path (ECMP) based switching fabric, a simplified network, and fully utilized link bandwidth on each network node. It also allows the networks to scale and grow incrementally, on demand. Cisco's next generation SDN based data center network fabric architecture, ACI, is also based on CLOS design principles.

Figure 3A:
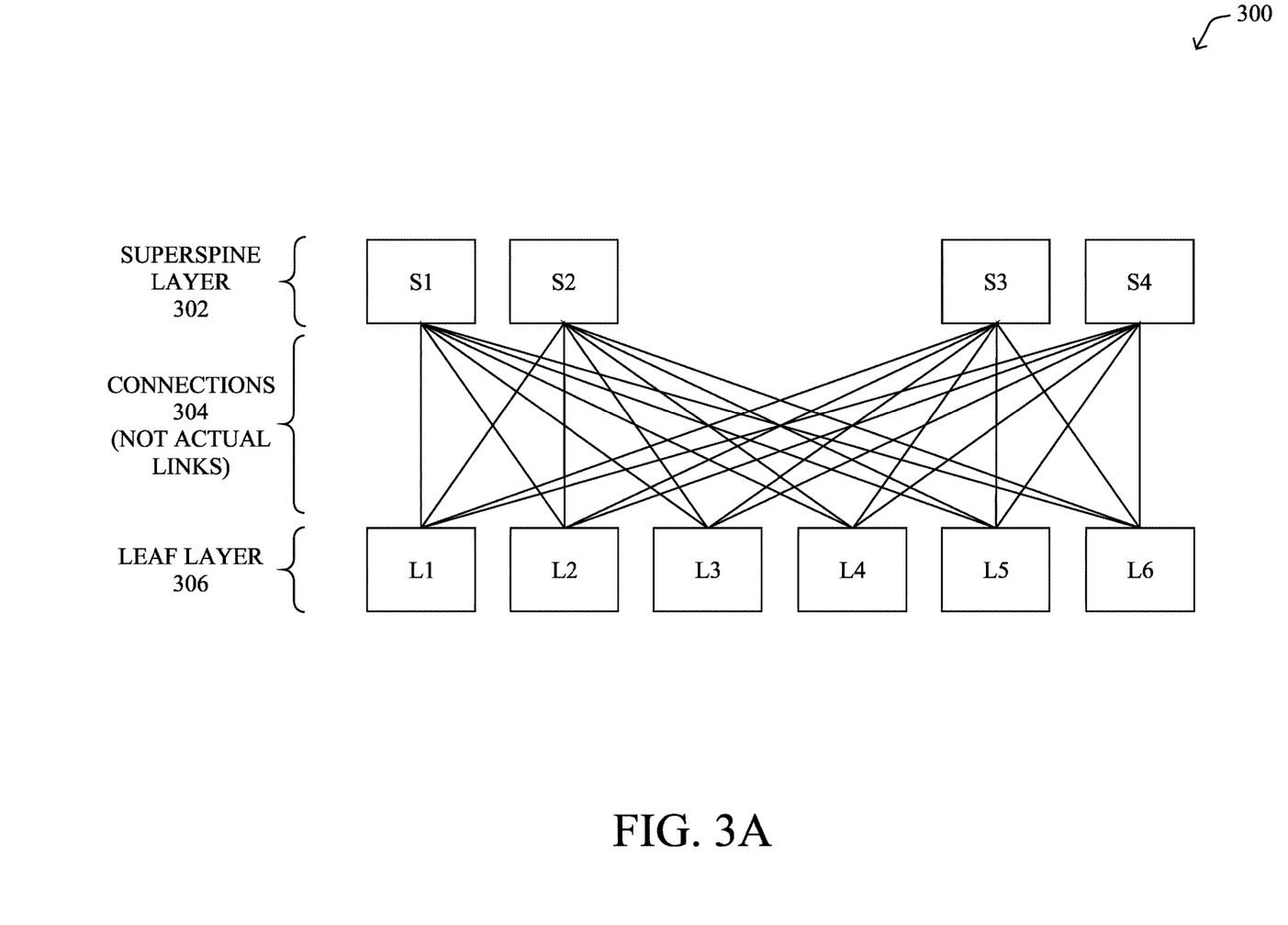
FIGS. 3A-3B illustrate examples of software defined networking (SDN) fabric implementations.

FIG. 3A illustrates a simplified example of an SDN fabric 300 that uses a leaf-spine architecture. As shown, the network switches S1-S4 and L1-L6 may be organized according to CLOS design principles. In particular, switches S1-S4 may form a superspine 302. This layer is also sometimes called the Top of Fabric (ToF) layer, such as in RIFT. At the south of fabric 300 is a leaf layer 306 that comprises switches L1-L6 and provide connectivity to the various clients of fabric 300, such as endpoints or virtual machines (VMs), and implement Layer 2 bridging and Layer 3 routing functions. Likewise, S1-S4 in superspine layer 302 may be fully meshed with L1-L6 in leaf layer 306 via connections 304, which are not actual links, in the physical sense. During operation, S1-S4 may provide redundant paths and connectivity from a previous lower-level stage switch in the network fabric.

Figure 3B:
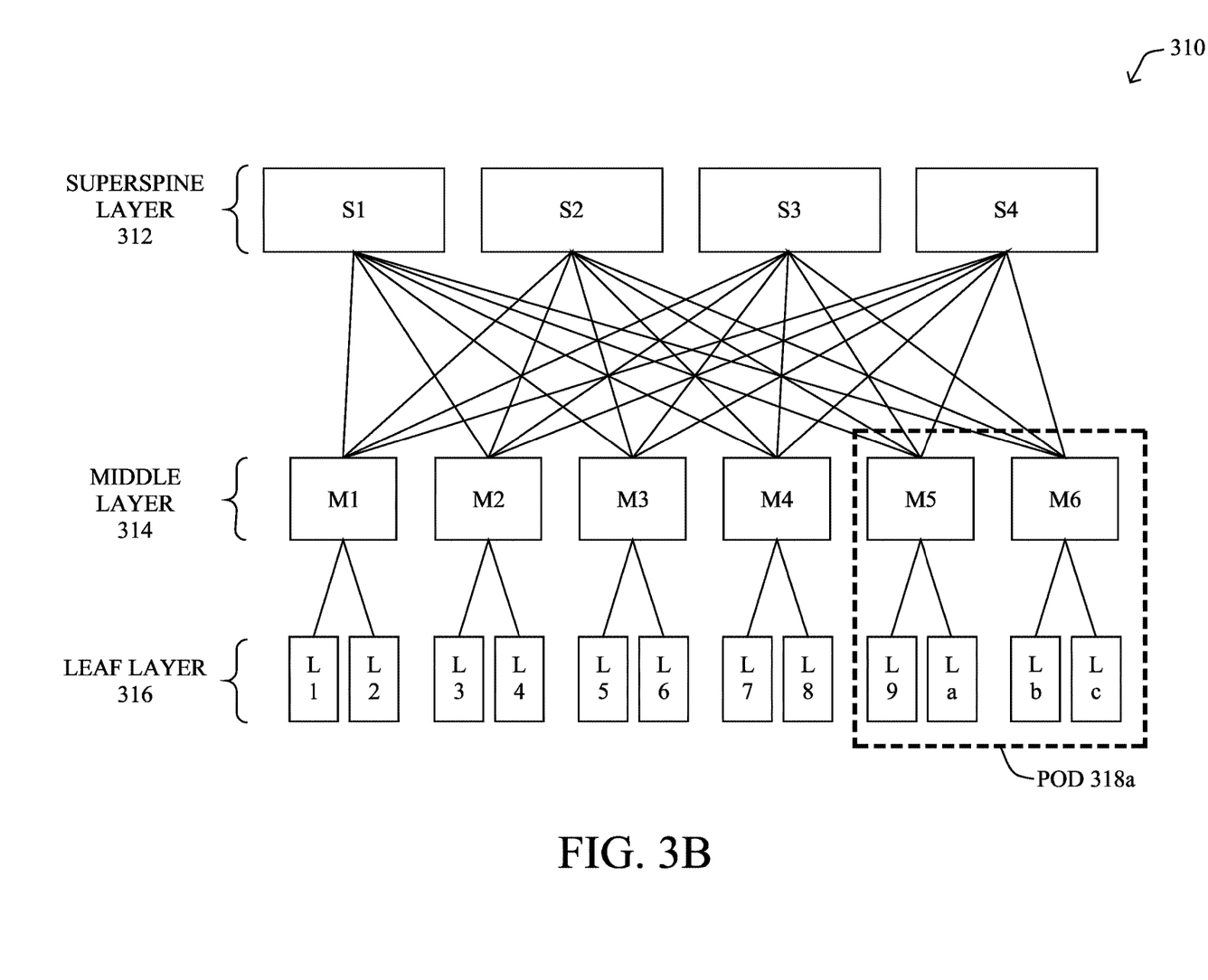

FIG. 3B illustrates another example SDN fabric 310 that uses a CLOS-based approach. As shown, at the top of fabric 310 are switches S1-S4 that form a superspine layer 312 that are connected to a middle layer 314 comprising switches M1-M6 which are, in turn, connected to a leaf layer 316 comprising switches L1-Lc. The overall function of fabric 310 may be similar to that of fabric 300 in FIG. 3A, with the addition of middle layer 314 that may perform, for example, aggregation functions. Leaf switches and their corresponding switches in middle layer 314 may also form pods, such as pod 318a shown.

Today, a large, virtualized data center fabric might be comprised of approximately 500-1000 leaf switches and as many as approximately 8-16 spine switches servicing many of its tenant's virtual networks on the shared, physical network infrastructure. Each leaf switch, in turn, may be connected to between 32-98 physical hypervisor servers, with each server hosting approximately 20 virtual servers/endpoints that estimate to between 1000-2000 endpoints connected per leaf switch. In such a shared network deployment, network access security becomes an important factor for consideration.

More specifically, in virtualized data center deployments, like ACI, the movement of endpoints from one leaf port to another, or from one endpoint group (typically tied to the dot1q VLAN the vSwitch tags to outgoing packets) to another within the same leaf or across leaf switches of the network fabric, is very common. In such loosely-coupled network connectivity models, where the locality of the endpoints is not fixed, the network fabric and the endpoints become vulnerable to attacks by the rogue devices. For example, if the initial network access or the subsequent endpoint moves are allowed without any verification, it might lead to severe security issues. This enforces an important requirement on the underlying first hop switches that are responsible for network connectivity: to grant network access only to authorized endpoints and deny connectivity to unauthorized devices.

Typically, If the switch fabric is close to saturation or if some of the exit links are almost fully loaded, accepting a new flow may create real saturation problem leading to congestion and packet drops not only with respect to the new flow, but also to existing flows. However, if the fabric saturation behaviors can be observed and predicted based on the characteristics of the first packets of a new flow (e.g., bandwidth, cycle, burstiness, etc.), the fabric can apply flow admission control policies to that flow, to determine whether to grant the flow access to the fabric.

Forecasting SDN Fabric Saturation and Machine Learning-Based Flow Admission Control The techniques herein introduce a proactive approach to flow admission control for an SDN fabric. In some aspects, the techniques herein use a heat map mechanism to construct a saturation model for the switch fabric. In turn, machine learning models are used to predict the characteristics of a new flow, based on the initial packets of the flow. These elements are then input to a flow admission control mechanism, to determine whether to admit or deny the flow to the fabric.

Specifically, in various embodiments, a supervisory device for a software defined networking (SDN) fabric predicts characteristics of a new traffic flow to be admitted to the fabric, based on a set of initial packets of the flow. The supervisory device predicts an impact of admitting the flow to the SDN fabric, using a heatmap-based saturation model for the SDN fabric. The supervisory device admits the flow to the SDN fabric, based on the predicted impact. The supervisory device uses reinforcement learning to adjust one or more call admission control (CAC) parameters of the SDN fabric, based on captured telemetry data regarding the admitted flow.

Illustratively, the techniques described herein may be performed by hardware, software, and/or firmware, such as in accordance with the fabric saturation analysis process 248 which may include computer executable instructions executed by the processor 220 (or independent processor of interfaces 210) to perform functions relating to the techniques described herein.

Operationally, a first component of the techniques herein provides for the generation of a heatmap-based saturation model for the SDN fabric. Indeed, by analyzing the behavior of the switch fabric, a saturation model can be constructed to predict when and where the fabric will become saturated, if new flows are accepted onto the fabric. In various embodiments, fabric saturation process 248 may obtain any or all of the following telemetry data from the SDN fabric, to construct the heatmap model:

Link Utilization—how much each link in the SDN fabric is used (e.g., in terms of number of flows, bandwidth, etc.).

Hardware Resource Utilization—how much CPU, memory, etc. is consumed and/or available on each switch of the SDN fabric.

Queue Utilization—how much each queue is used.

Buffer Overflow Information—whether any buffer overflows have occurred on a given switch of the SDN fabric.

Netflow or IPFIX Statistics

Figure 4:
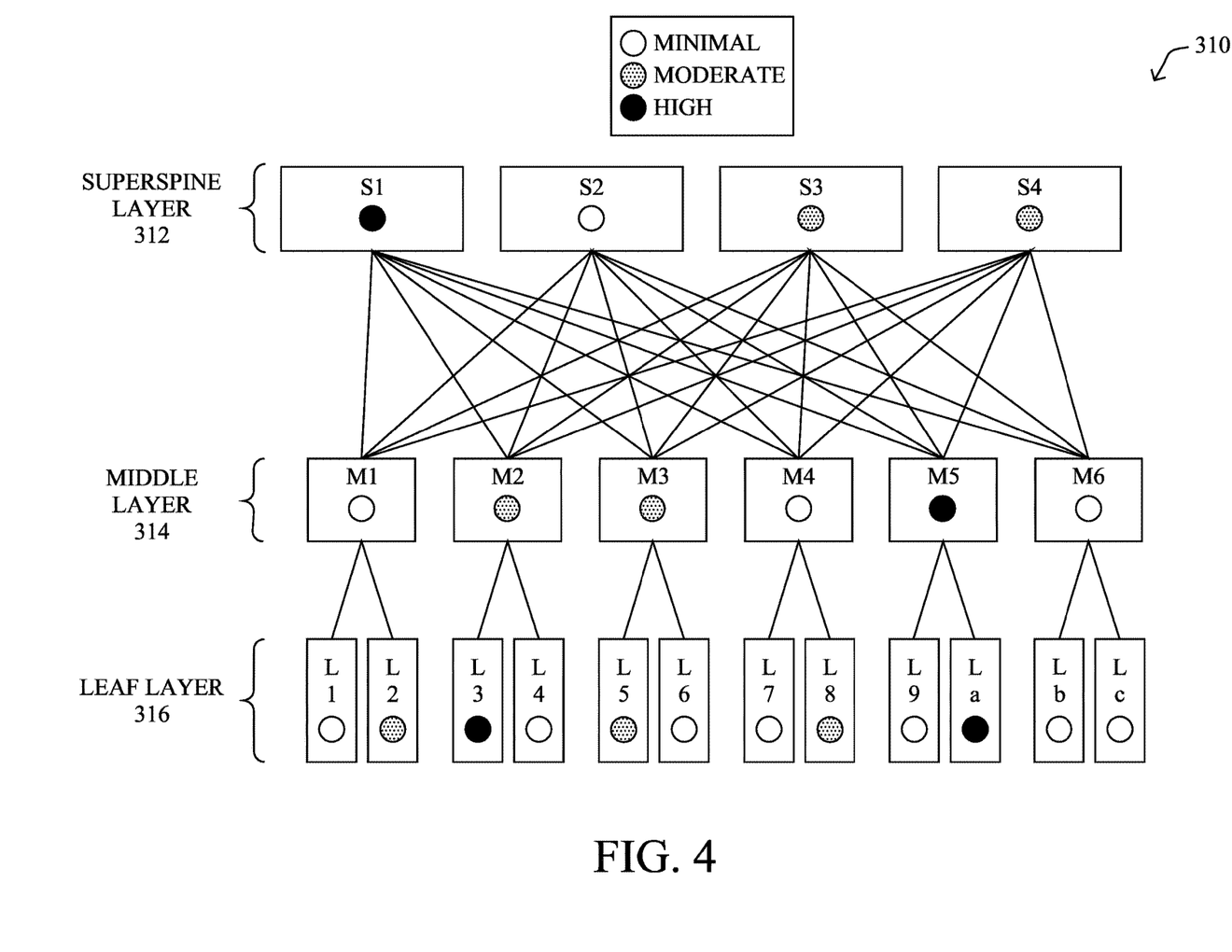
FIG. 4 illustrates an example heatmap for an SDN fabric.

FIG. 4 illustrates an example heatmap for an SDN fabric, in accordance with various embodiments. Continuing the example of FIG. 3B, assume that any or all of the telemetry data listed above has been collected from SDN fabric 310 over time. In various embodiments, this information can be used to generate a machine learning-based model, such as a classifier, that labels each switch/node in SDN fabric 310 with a 'color' that represents its likelihood of saturation, should another flow be added to SDN fabric 310. For example, some switches in SDN fabric 310 (e.g., S2, M1, M4, M6, etc.) may be labeled as being only minimally affected by the addition of a flow. Conversely, some switches in SDN fabric 310 (e.g., S1, M5, L3, etc.) may be labeled as being highly impacted by an additional flow. In between these two extremes may be switches that may only be moderately affected by the addition of a flow (e.g., S3, S4, M2, M3, etc.).

As would be appreciated, the heatmap model may use any number of discrete labels, such as "red," "yellow," and "green," to represent the varying degrees of impact that a new flow would have on that switch. Alternatively, the heatmap model may use a more continuous scale, such as on a sliding scale from 0-1, 1-10, etc. Regardless of the type of coloring used, the represented impact may quantify any or all of the following:

- Queue length or waiting time—for example, a minimal impact label may correspond to a new flow having little to no change on the average queue length or queue waiting time of the node.
- Resource usage—for example, a high impact label may correspond to a new flow increasing the CPU usage of the switch above a predefined threshold.
- Link congestion—for example, a high impact label may correspond to a new flow causing a link of the switch to exceed a predefined level of congestion.

In addition to the above, the impact labels of the heatmap may also take into account statistical factors, such as an average over the prior x-number of minutes, the N-percentile distribution over the prior x-number of minutes, water marks, or the like.

According to various embodiments, another function of the fabric saturation analysis process may be to predict the characteristics of a new traffic flow to be admitted to the fabric, based on a set of initial packets of the flow. More specifically, the fabric saturation analysis process may train a machine learning-based model to predict how a given flow is expected to behave in the SDN fabric, based on the characteristics of the first set of packets of the flow. The overall objective of this component is to predict the characteristics of the flow, when first detected at the ingress of the network.

Closely associated with the predicted characteristics of the new flow are the expected networking resources that would be required for the SDN fabric to support the flow. For example, the flow characteristics prediction model may predict the bandwidth consumption, packet sizes, flow duration and other timing information (e.g., seasonality, inter-arrival times of packets, etc.), protocols, destinations, QoS requirements, or the like, of the flow.

In turn, the fabric saturation process may compare the predicted flow characteristics of the flow to the output of its heatmap-based model of the SDN fabric, to determine whether the network can safely admit the new flow considering the current states of the resources (e.g., queue length, etc.), while meeting the required SLA for the new flow and without impacting the existing flows in the fabric. In addition, the fabric saturation analysis process may use the predicted flow duration of the new flow to determine whether the expectation duration is worth rejecting the new flow. For example, it may be acceptable to accept a new flow with relatively high resource requirements, if it has a very short duration, yet reject a flow with similar requirements, if that flow is long-lived.

Figure 5:
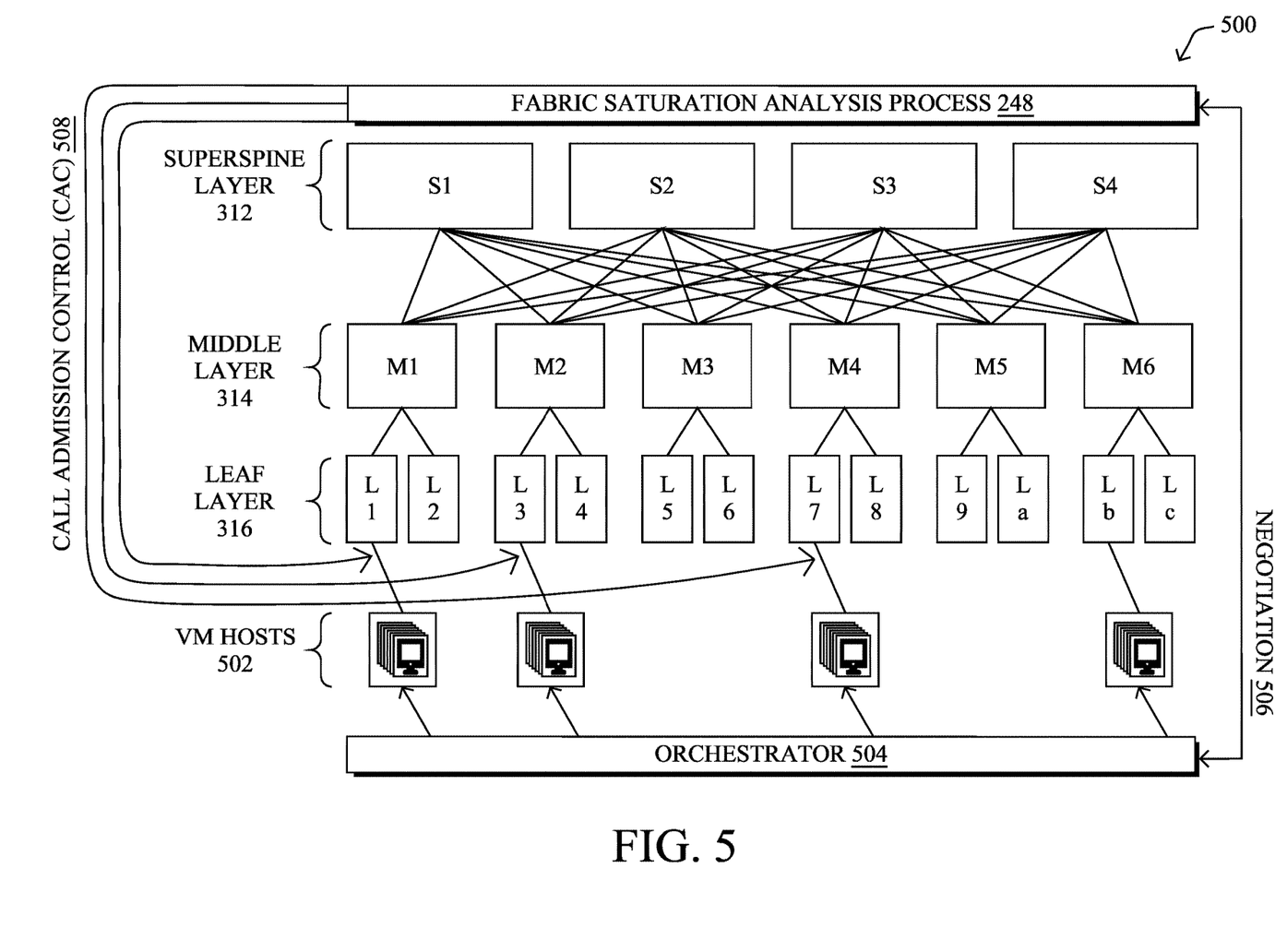
FIG. 5 illustrates an example architecture for flow admission control in an SDN fabric.

In one embodiment, a regression model could be used to compute a vector of predicted flow characteristics, based on a series of input features obtained from telemetry data regarding the set of initial packets (e.g., the first ten packets, etc.). For example, the telemetry data may be captured by performing deep packet inspection (DPI) on the initial packets of the flow, to capture any or all of the following characteristics for input to the model:

- Protocols in Use—for example, SIP, RTP, TCP, HTTP, etc.
- Flow Seasonality
- Source—Destination Information—e.g., the source and destination addresses, ports, etc.
- Payload Information
- Packets Size Information
- QOS Information
- Packet inter-arrival Time Information FIG. 5 illustrates an example architecture 500 for flow admission control in an SDN fabric, according to various embodiments. Continuing the example of SDN fabric 310 described previously with respect to FIG. 3B, assume that any number of virtual machines (VMs) are hosted by any number of VM hosts 502. During operation, an orchestrator 504 may be responsible for overseeing the spawning and despawning of VMs on VM hosts 502. For example, in the case of distributed processing, each VM may perform a particular calculation or other function, in order to produce result data for consumption by a connecting client.

In various embodiments, architecture 500 may also include fabric saturation analysis process 248 executed by the same device as that of orchestrator 504 or another device in communication therewith. During execution, fabric saturation analysis process 248 may use the predicted flow characteristics of a new flow, and the heatmap-based saturation model of the fabric, both described above, to decide whether to admit the new flow into the fabric or drop the flow, to avoid saturation and congestion problems. In a simple embodiment, fabric saturation analysis process 248 may assess only a single flow characteristic, such as predicted bandwidth consumption vs. predicted bandwidth availability in the fabric, to determine whether to admit the flow or not. In further embodiments, fabric saturation analysis process 248 may assess multiple characteristics, to make the admission control decision. For example, fabric saturation analysis process 248 may determine whether the predicted bandwidth of the flow exceeds one threshold, the predicted flow duration exceeds a second threshold, etc. If any or all of these conditions are met, fabric saturation analysis process 248 may decide to drop the flow. Conversely, if fabric saturation analysis process 248 determines that the flow should be admitted, it may send a call admission control (CAC) signal to the fabric, to admit the flow.

In order to admit a flow to the fabric, fabric saturation analysis process 248 may also alter the ECMP ratio that a node in the fabric applies to the admitted flow for purposes of load balancing. As would be appreciated, the equal cost load balancing offered by ECMP selects the next switch for the flow going northward in the fabric. For example, a switch in middle layer 314 may use its ECMP ratio to select which switch in superspine layer 312 is to receive the flow. In some embodiments, if a flow is to be admitted to the fabric, fabric saturation analysis process 248 may program that the flow is to use a certain set of one or more switches in superspine layer 312. Although not as apparent in FIG. 5 for brevity purposes, a similar mechanism can be employed between leaf layer 316 and middle layer 314. In further cases, fabric saturation analysis process 248 can also use certain paths towards superspine layer 312 to observe flows that have not been seen before. Once observed, fabric saturation analysis process could use different ECMP ratios to reroute the flow to a more normal behavior.

In another embodiment, fabric saturation analysis process 248 may also leverage a reinforcement learning approach, to form a feedback loop after admitting a given flow. As would be appreciated, reinforcement learning is a machine learning approach that seeks to take actions that maximize a reward function. For example, assume that fabric saturation analysis process 248 based its flow admission decision on a set of conditions (e.g., predicted bandwidth <P, predicted duration <D, etc.). After admitting the flow, fabric saturation analysis process 248 may leverage specialized signaling with the networking devices along the path of the flow within the fabric, to continue to observe whether these conditions hold true. The path taken by the flow may be dynamically retrieved by fabric saturation analysis process 248 by performing a lookup, when a distributed routing protocol is used in the fabric.

After receiving such signaling from fabric saturation analysis process 248, each receiving switch along the path of the new flow may capture telemetry regarding the impact of the newly admitted flow. This telemetry data can then be sent back to fabric saturation analysis process 248, to evaluate the true impact on the network. If there is a discrepancy between the predicted impact and the actual impact, fabric saturation analysis process 248 may adjust one or more of the call admission parameters that it uses to admit flows to the SDN fabric. For example, rather than compare the predicted bandwidth of a new flow to a threshold P, fabric saturation analysis process 248 may instead compare the predicted bandwidth to an adjusted threshold P', if the telemetry data from the fabric indicates a discrepancy.

In further embodiments, fabric saturation analysis process 248 can also influence the spawning and placement of new VMs by orchestrator 504. For example, prior to orchestrator 504 spawning a new VM on one of VM hosts 502, orchestrator 504 may perform a negotiation 506 with fabric saturation analysis process 248, to assess whether the proposed VM placement on one of VM hosts 502 would result in a new flow that could negatively impact the SDN network fabric.

During negotiation 506, in some embodiments, orchestrator 504 may ask fabric saturation analysis process 248 for permission to place a new VM on one of VM hosts 502. Accordingly, orchestrator 502 may include the location of the proposed VM, as well as flow characteristics of any flows expected for that VM, as part of the request. In some embodiments, orchestrator 504 may base the expected flow characteristics on a prior incarnation of the VM identified from a 5-tuple associated with the VM. For example, if the traffic of a previous VM has the same 5-tuple (e.g., the source IP address/port number, destination IP address/port number and the protocol in use) as the new VM, it may be assumed that the flow characteristics for the prior VM will approximate those of the new VM. In another embodiments, the expected flow characteristics for the new VM may be based on the expected needs of the flow (e.g., the flow specs).

By way of example, if fabric saturation analysis process 248 predicts a risk of incast/congestion, before it even needs to do a CAC, it can use negotiation 506 with orchestrator 504 to notify orchestrator 504 of the predicted congestion. In turn, orchestrator 504 may recognize the VMs involved and potentially move some or all of them, to alleviate the congestion condition. For example, fabric saturation analysis process 248 may notify orchestrator 504 that incast is coming on egress port X and that the major flows are $F_1, F_2, \ldots, F_n$ on ports $P_1, P_2, \ldots, P_n$. Orchestrator 504 can then recognize the VMs responsible for these flows and rearrange them, as needed. Ideally, negotiation 506 should lead to the final ideal port for each VM. However, if no suitable solution is found due to high risk, fabric saturation analysis process 248 may signal to orchestrator 504 to block the addition of a new VM until the conditions in the fabric allow for its addition.

Figure 6:
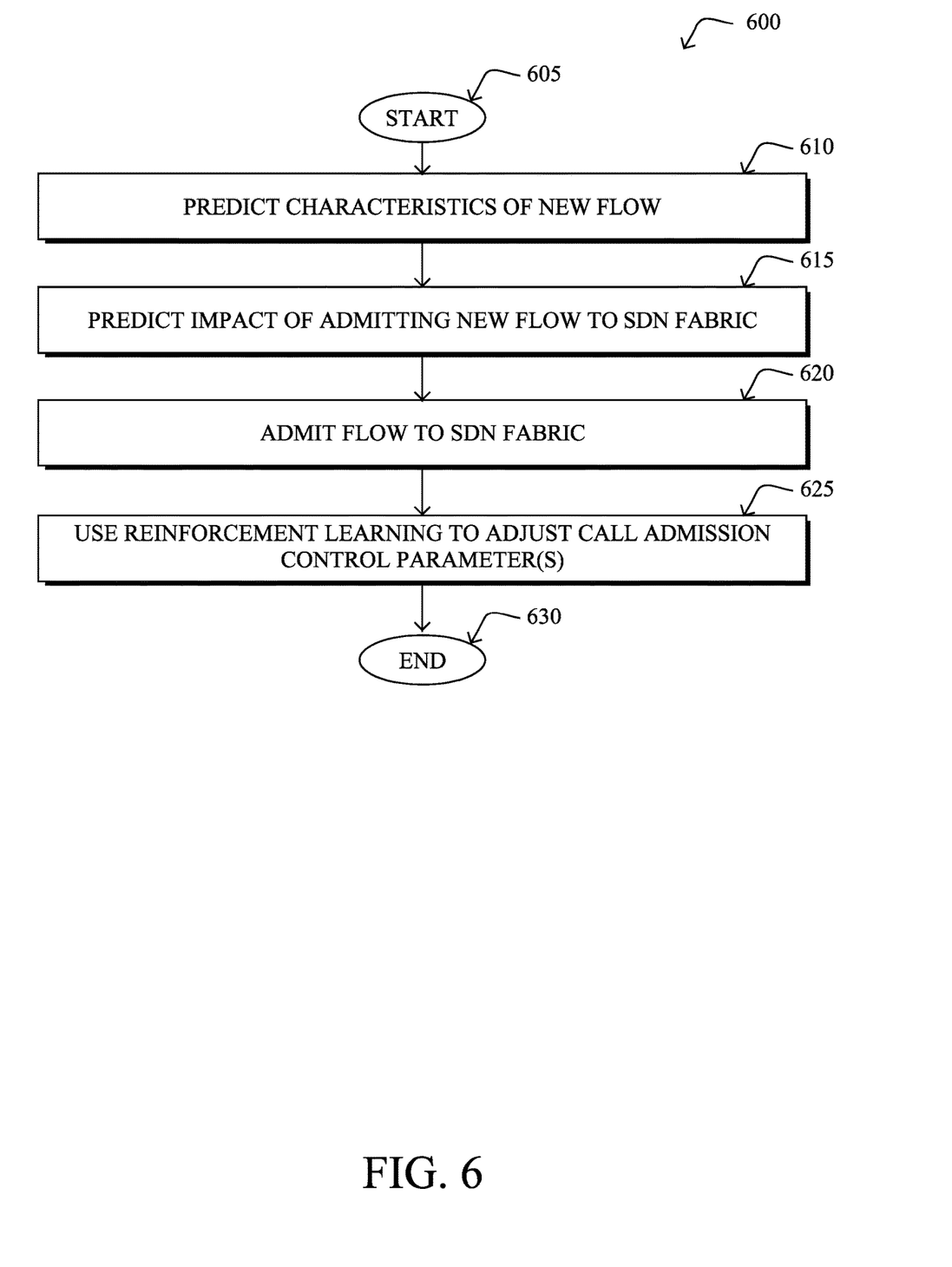
FIG. 6 illustrates an example simplified procedure for admitting a flow to an SDN fabric.

FIG. 6 illustrates an example simplified procedure for admitting a flow to an SDN fabric, in accordance with one or more embodiments described herein. For example, a non-generic, specifically configured supervisory device for the fabric (e.g., device 200) may perform procedure 600 by executing stored instructions (e.g., process 248). The procedure 600 may start at step 605, and continues to step 610, where, as described in greater detail above, the supervisory device may predict characteristics of a new traffic flow to be admitted to the fabric, based on a set of initial packets of the flow. In particular, the supervisory device may obtain telemetry data regarding the first n-number of packets of the flow. Such telemetry data may be captured through DPI, Netflow, IPFIX, or other telemetry capturing mechanisms in the network. In turn, the device may use the captured telemetry as input to a regression or other machine learning-based model to predict the future characteristics of the flow. For example, the model may predict one or more of: seasonality information, protocol information, packet size information, inter-arrival timing information, payload information, quality of service (QoS) information, or source-destination information regarding the flow.

At step 615, as detailed above, the supervisory device may predict an impact of admitting the flow to the SDN fabric, using a heatmap-based saturation model for the SDN fabric. Notably, in addition to modeling the predicted behavior of a given traffic flow, the device may also maintain a machine learning-based model for the behavior of the SDN fabric itself. For example, the heatmap-based model may color portions of the SDN fabric based on one or more of the following: link utilization, hardware resource utilization, or queue length of the networking devices in the fabric.

At step 620, the supervisory device may admit the flow to the SDN fabric, based on the predicted impact, as described in greater detail above. More specifically, the device may compare the predicted flow characteristics to one or more CAC parameters, to determine whether to admit the flow. If, for example, the path associated with the flow comprises switches or other devices that have more than sufficient resources to accommodate the predicted requirements of the flow, the supervisory device may determine that admitting the flow will have little impact. Conversely, if the networking devices are already at, or near, saturation, the supervisory device may determine that admitting the flow would have a significant impact on the fabric. In further embodiments, the supervisory device may also alter the ECMP ratio that a node in the fabric applies to the admitted flow, as detailed above.

At step 625, as detailed above, the supervisory device may use reinforcement learning to adjust one or more CAC parameters of the SDN fabric, based on captured telemetry data regarding the admitted flow. For example, if the admission decision is based in part on a comparison of the predicted bandwidth of the flow to a threshold, and the telemetry data regarding the admitted flow indicates that contention actually resulted, the device may lower the acceptable threshold, when making further flow admission decisions. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for flow admission control in an SDN fabric, based on the predicted characteristics of the flow and the predicted impact of the admission on the fabric. As would be appreciated, such a proactive mechanism can greatly reduce saturation conditions in the SDN fabric.

While there have been shown and described illustrative embodiments that provide for flow admission control to an SDN fabric, it is to be understood that various other adaptations and modifications may be made within the spirit and scope of the embodiments herein. For example, while certain embodiments are described herein with respect to using certain models for purposes of predicting congestion, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   predicting, by a supervisory device for a software defined networking (SDN) fabric, characteristics of a new traffic flow to be admitted to the fabric, based on a set of initial packets of the flow;
   predicting, by the supervisory device, an impact of admitting the flow to the SDN fabric, using a heatmap-based saturation model for the SDN fabric;
   admitting, by the supervisory device, the flow to the SDN fabric, based on the predicted impact; and
   using, by the supervisory device, reinforcement learning to adjust one or more call admission control (CAC) parameters of the SDN fabric, based on captured telemetry data regarding the admitted flow,
   wherein the predicted characteristics of the flow comprise one or more of: seasonality information, protocol information, packet size information, inter-arrival timing information, payload information, quality of service (QoS) information, or source-destination information regarding the flow.

2. The method as in claim 1, wherein the heatmap-based saturation model for the SDN fabric colors portions of the SDN fabric based on one or more of the following: link utilization, hardware resource utilization, or queue length.

3. The method as in claim 1, wherein predicting characteristics of the new traffic flow comprises:
   obtaining telemetry data regarding the set of initial packets of the flow; and
   using the telemetry data regarding the set of initial packets of the flow as input to a regression model configured to predict the characteristics of the flow.

4. The method as in claim 1, further comprising:
   obtaining, by the supervisory device, flow information regarding traffic expected for a new virtual machine (VM) that is to use the SDN fabric;
   using, by the supervisory device, the for the SDN fabric to predict an impact of the new VM on the SDN fabric.

5. The method as in claim 4, wherein the flow information regarding the traffic expected for the new VM that is to use the SDN fabric is based on a prior incarnation of the VM identified from a 5-tuple associated with the VM.

6. The method as in claim 4, further comprising:
   preventing, by the supervisory device, the VM from using the SDN fabric, based on the predicted impact of the new VM on the SDN fabric.

7. The method as in claim 4, further comprising:
   initiating, by the supervisory device, movement of a VM that uses the SDN fabric to another port, based on the predicted impact of the new VM on the SDN fabric.

8. A method comprising:
   predicting, by a supervisory device for a software defined networking (SDN) fabric, characteristics of a new traffic flow to be admitted to the fabric, based on a set of initial packets of the flow;
   predicting, by the supervisory device, an impact of admitting the flow to the SDN fabric, using a heatmap-based saturation model for the SDN fabric;
   admitting, by the supervisory device, the flow to the SDN fabric, based on the predicted impact;
   using, by the supervisory device, reinforcement learning to adjust one or more call admission control (CAC) parameters of the SDN fabric, based on captured telemetry data regarding the admitted flow;
   obtaining, by the supervisory device, flow information regarding traffic expected for a new virtual machine (VM) that is to use the SDN fabric;
   using, by the supervisory device, the for the SDN fabric to predict an impact of the new VM on the SDN fabric.

9. An apparatus, comprising:
   one or more network interfaces to communicate with a software defined networking (SDN) fabric;
   a processor coupled to the network interfaces and configured to execute one or more processes; and
   a memory configured to store a process executable by the processor, the process when executed configured to:
      predict characteristics of a new traffic flow to be admitted to the fabric, based on a set of initial packets of the flow;
      predict an impact of admitting the flow to the SDN fabric, using a heatmap-based saturation model for the SDN fabric;
      admit the flow to the SDN fabric, based on the predicted impact; and
      use reinforcement learning to adjust one or more call admission control (CAC) parameters of the SDN fabric, based on captured telemetry data regarding the admitted flow, wherein the predicted characteristics of the flow comprise one or more of: seasonality information, protocol information, packet size information, inter-arrival timing information, payload information, quality of service (QoS) information, or source-destination information regarding the flow.

10. The apparatus as in claim 9, wherein the heatmap-based saturation model for the SDN fabric colors portions of the SDN fabric based on one or more of the following: link utilization, hardware resource utilization, or queue length.

11. The apparatus as in claim 9, wherein the apparatus predicts the characteristics of the new traffic flow by:
   obtaining telemetry data regarding the set of initial packets of the flow; and
   using the telemetry data regarding the set of initial packets of the flow as input to a regression model configured to predict the characteristics of the flow.

12. The apparatus as in claim 9, wherein the process when executed is further configured to:
   obtain flow information regarding traffic expected for a new virtual machine (VM) that is to use the SDN fabric;
   use the heatmap-based saturation model for the SDN fabric to predict an impact of the new VM on the SDN fabric.

13. The apparatus as in claim 12, wherein the flow information regarding the traffic expected for the new VM that is to use the SDN fabric is based on a prior incarnation of the VM identified from a 5-tuple associated with the VM.

14. The apparatus as in claim 12, wherein the process when executed is further configured to:
   prevent the VM from using the SDN fabric, based on the predicted impact of the new VM on the SDN fabric.

15. The apparatus as in claim 12, wherein the process when executed is further configured to:
   initiate movement of a VM that uses the SDN fabric to another port, based on the predicted impact of the new VM on the SDN fabric.

* * * * *